Oct. 6, 1964 J. K. BROWN 3,152,247

PUNCHED CARD READER AND SWITCH CONTACT

Filed Sept. 20, 1961 2 Sheets-Sheet 1

INVENTOR.
JOHN K. BROWN

BY
William R. Nolte

AGENT

PUNCHED CARD READER AND SWITCH CONTACT

Filed Sept. 20, 1961 2 Sheets-Sheet 2

*INVENTOR.*
JOHN K. BROWN
*BY*
William R. Nolte
AGENT

United States Patent Office 3,152,247

Patented Oct. 6, 1964

3,152,247
PUNCHED CARD READER AND SWITCH CONTACT

John K. Brown, Sharon Hill, Pa., assignor to Burroughs Corporation, Detroit, Mich., a corporation of Michigan Filed Sept. 20, 1961, Ser. No. 139,446
6 Claims. (Cl. 235—61.11)

The present invention relates to improved punched card readers and to one piece switch contacts co-operable therewith.

Punched card readers in the past have included a base containing parallel rows of spring loaded contacts retained in opposed hinged relationship to a pressure plate carrying a printed circuit board. A punched card placed upon the base may be read when the pressure plate is moved to press the card down on the spring loaded contacts. Where perforations exist, the contacts pass through the card and against conductive circuit paths on the printed circuit board thus to connect selected contacts which give desired switching operations through such contacts to external circuits.

Heretofore such contacts have generally been made of two or more machined pieces, including spring and plunger elements, and having portions thereof sandwiched between contact plate members of the reader. This construction has materially increased the cost of production.

It is an important object of this invention to provide a punched card reader of improved and economical design facilitating the reading of such cards.

It is also an important object of this invention to provide improved one piece, resilient sheet metal contacts of simplified construction, which are inexpensive to manufacture and are especially adapted for use in card readers.

Briefly, a program card reader in accordance with the invention comprises a pair of pivotally connected frame members one of which supports a printed circuit board having electrically conductive paths therein and the other supporting an electrically non-conductive contact panel. A plurality of one piece switch contacts supported in the panel, are adapted to contact the printed circuit board when the frame members are in closed card reading relationship. Each switch contact, in a more specific aspect of the invention, includes a central bow shaped portion of double thickness of material having a centrally located protrusion for point contact with the printed circuit board, and includes a pair of leg portions depending therefrom to facilitate securement of the same by clenching engagement with the contact panel of the card reader.

An outstanding feature of the invention is the arrangement of the elevated central portion of the contacts, and depending leg portions thereof which enable simplification of the construction of both the contacts and the card reader, thus effecting economy in the overall cost of the card reader.

For a better understanding of the present invention, together, with other and further objects thereof, reference is had to the following description taken in conjunction with the accompanying drawing, and its scope will be pointed out in the appended claims.

Figure 1:
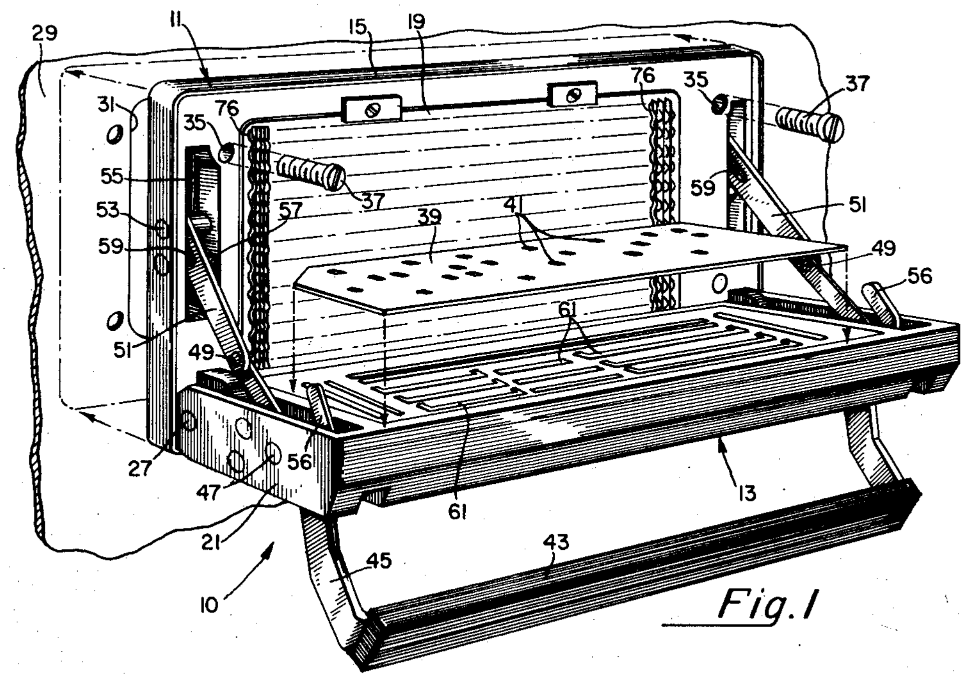
FIG. 1 is a perspective view, partly schematic of the improved card reader showing the several parts thereof in open relationship.
Figure 2:
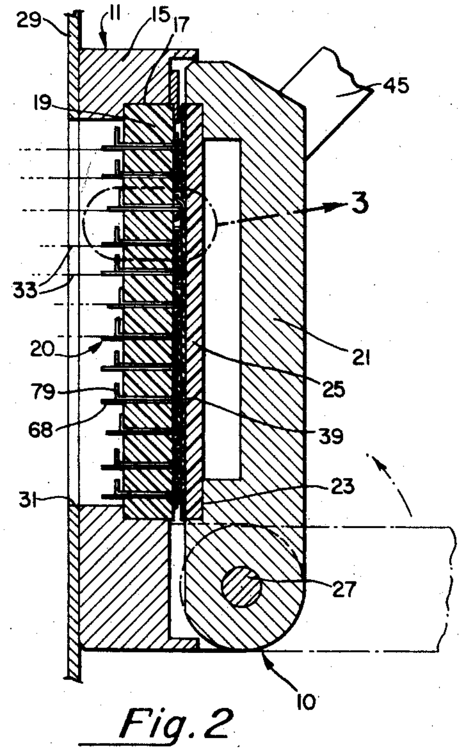
FIG. 2 is a sectional view through the card reader with parts thereof in closed relationship with a perforated record card therebetween.

Referring to FIGS. 1 and 2 of the drawing, there is shown a punched card reader 10 having a vertically disposed contact board assembly board 11, and a printed circuit board assembly 13. The contact board assembly includes a frame 15 recessed as at 17 to receive a contact carrying board 19, the latter formed of electrically insulative material. A plurality of one piece resilient contacts 20 in accordance with an important feature of the invention, and to be described in greater detail hereinafter, are supported in rows and columns on the contact board. The printed circuit assembly 13 also includes a frame 21 suitably recessed as at 23 for receiving therein a printed circuit board 25. Frame 21 is pivoted to the frame 15 by means of hinge pivots 27. As seen in FIG. 1 the contact board assembly is disposed adjacent a vertical wall or panel 29 which includes an access opening 31 to permit the passage of input and output wiring 33 connected to the contacts 20. The contact frame 15 includes apertures 35 which are used to fasten the frame to the wall 29 by means of screws 37.

A punched card 39 having perforations 41, also disposed in rows and columns therein, may be read by placing it in the card reader and, by means of handle 43, moving frame 21 upwardly in closed relationship with frame 15, as seen in FIG. 2. Links 45 integral with the handle 43 are pivotally connected intermediate their length, to frame 21 by studs 47, each link 45 being connected at its inner end by pivot 49 to a second link 51 which in turn is pivotally secured to contact frame 15 as at 53. The latter frame includes recesses as at 55 to receive a projecting cam-like finger 56 integral with links 45. Link 51 includes an elongated cut-out portion 59 to permit sliding linear movement of the same relative to the pivot 53. As the frame 13 is rotated about pivot 27, link 51 is advanced into the recess 55, while finger 56 on link 45 is cammed into a closed position by riding on camming rod 57 within recess 55, thus locking the frame 13 into closed face contact with frame 15, as seen in FIG. 2. With the card reader in its closed position, as described, selected contacts 20 make electrical contact with conductive paths 61 on the printed circuit board 25 by passing through holes 41 in the punched card 39.

Figure 6:
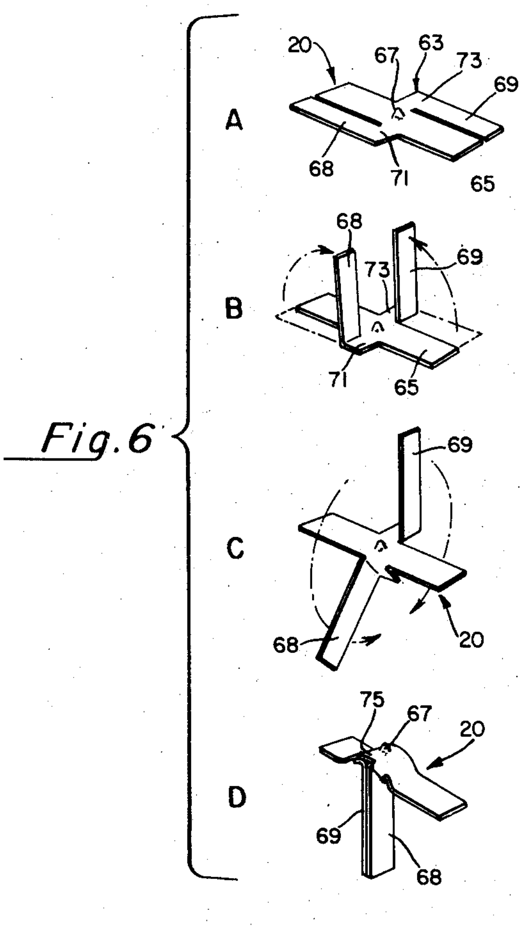
FIG. 6A is a view of a flat blank in the forming of the contact.
FIGS. 6B and 6C are perspective views of the contact illustrating intermediate steps in the process of its formation.
FIG. 6D is a perspective view of the completed contact.

Referring now to FIG. 6, it is seen that in fabricating a contact 20, a blank 63 of untempered electrically conductive material such as beryllium copper may be stamped into the generally rectangular configuration shown in FIG. 6A, to include a central portion 65 having an elevated contact point 67 centrally located therein. The latter contact point may be formed by dimpling to provide point contact with the previously mentioned printed circuit paths 61 of printed circuit board 25. The blank includes two leg portions 68 and 69 connected to flange portions 71, 73 respectively, disposed on opposite sides and midway of the central portion 65 of the blank. The legs 68 and 69 extend in opposite directions one from the other along opposite sides of the blank. As seen in FIG. 6B, the legs are bent upwardly 90° from the plane of the central portion of the blank toward each other, so as to form an L configuration with flange portions 71 and 73 respectively. Flanges 71 and 73 and the legs integral therewith are thereafter bent 180° toward each other as indicated by the arrows in FIG. 6C, to form a double thickness of material with central portion 65. Finally as seen in FIG. 6D, the flanges 71 and 73, and central portion 65, are suitably curved as at 75 into a raised or dome shape with legs 68 and 69 in abutting relationship with one another. Upon conclusion of the above steps, the contacts may then be suitably heat treated to obtain the desired properties of stiffness and resiliency.

Figure 7:
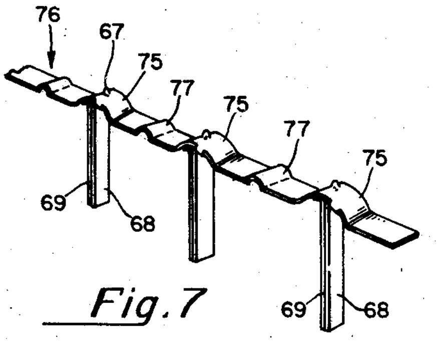
FIG. 7 is an alternate form of the contacts wherein a plurality are interconnected.

In the alternate form of the invention, as illustrated in FIG. 7, the contacts are fabricated in a continuous strip 76 wherein the contacts are interconnected by means of curved intermediate portions 77. In this form of construction the bending and form operations are essentially the same as illustrated in FIGS. 6A and 6D inclusive, with the exception that the portions 77 are bowed upwardly in a similar manner but are of a smaller scale than the bowed head portions 75. Single contacts may be made by cutting each strip 76 to eliminate the curved portions 77.

Figure 3:
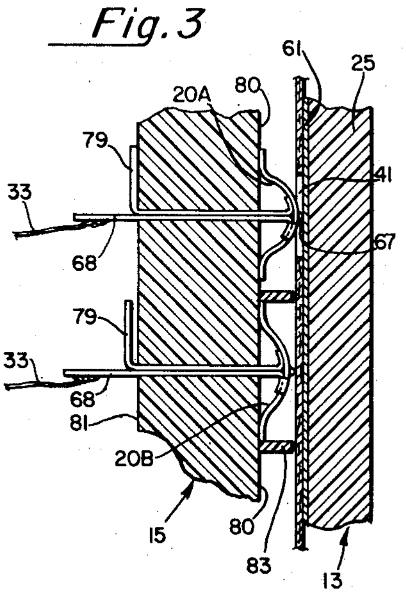
FIG. 3 is a fragmentary portion of FIG. 2 greatly enlarged and illustrating the sheet metal contacts in side elevation.
Figure 4:
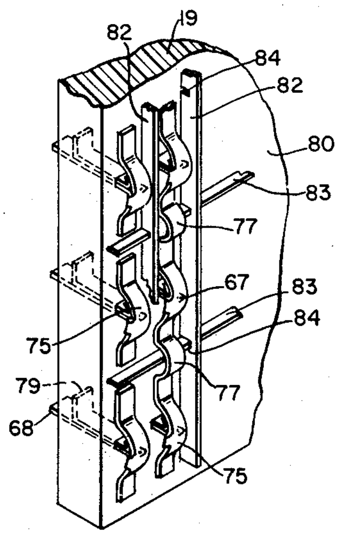
FIG. 4 is a perspective view showing a fragmentary portion of the card reader illustrating two forms of the contacts assembled on the reader.
Figure 5:
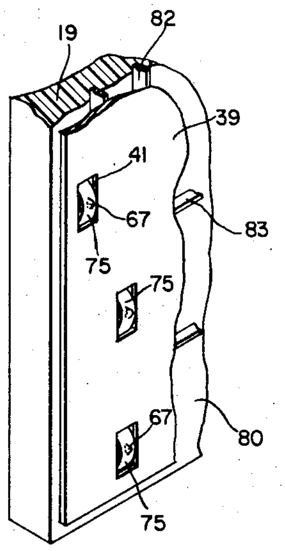
FIG. 5 is a view similar to FIG. 4 showing portions of the contacts, protruding through apertures in a punched record card being sensed.

As seen in FIG. 4 the contacts 20 are shown assembled upon contact board 17 wherein the abutting legs 68 and 69 are passed through apertures 78 in the board. The bowed portion 75 of the contact is positioned adjacent inner face 80 of the board with its terminal edges resiliently urged against its surface by leg 79 which is bent into clenching engagement with the back surface 81 thereof, thus securing each contact in place on the board. When so connected the unbent leg 68, as seen in FIG. 3, may be interconnected with input circuit wires 33 as by soldering or other means. As further seen in FIG. 3, the uppermost contact 20A protrudes through an aperture 41 in the card so that the raised dimple 67 make contact with the printed circuit path 61 of the printed circuit board 25. The lower contact 20B is disposed opposite the portion of the card which contains no hole. In this condition due to the pressure engagement existing between the printed circuit assembly 13 and the contact assembly 11, the curvature of the dome portion of the lowermost contact flattened.

In order to preclude adjacent contacts from electrically shorting out one with another, electrically non-conductive bars or fences 82, 83, FIG. 4, may be provided. The bars 82 are placed between vertical columns of contacts to prevent contacts in one column from touching contacts in an adjacent column, while bars 83 are placed between horizontal rows of contacts and are received in notches 84 of bars 82 to prevent contacts in adjacent rows from shorting out. Where contacts of strip form 76 are employed as illustrated in the second column, FIG. 4, the insulative bars 83 are passed between the curved interconnecting portions 77 and the surface 80 of the contact board.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. The invention therefore is to be limited only as indicated by the scope of the following claims.

What is claimed is:

1. A mechanism for reading perforated record cards comprising in combination, a pair of frame members pivotally mounted with respect to each other, and movable from an open position for placement of a perforated record card therein, to a closed position with the record card therebetween, a printed circuit board having electrical circuit paths thereon supported by one of said frame members, a switch panel having a plurality of apertures therein and supported by said other frame member in alignment with said printed circuit board, a switch element secured in each of said apertures of said switch panel, each element having a bow shaped head portion abutting one surface of said panel and adapted to extend through a hole in a record card to make electrical contact with a circuit path on said board, and including an integral leg portion extending from said bow shaped portion into its associated aperture in said panel.

2. A mechanism, as set forth in claim 1 wherein said leg portion includes a portion clenched into engagement with the opposite surface of said switch panel.

3. A mechanism as set forth in claim 1, wherein said bow-shaped head portion of each said contact is formed of resilient spring-like material such that in the closed position of said frame members and with the contact thereof disposed opposite a non-apertured portion of the card, said contact will be deflected in compression and upon movement of said frame members to their open position said dome-shaped portion will be restored to its normal undeflected shape.

4. A mechanism for reading perforated record cards comprising in combination, a pair of frame member pivotally mounted with respect to each other, and movable from an open position for placement of a record card therein to a closed position with the record card therebetween, a printed circuit board having electrical circuit paths thereon supported by one of said frame members, a switch panel having a plurality of apertures therein and supported by said other frame member in alignment with said printed circuit board, a switch element secured in each of said apertures of said switch panel, each element having a bow-shaped head portion abutting one surface of said panel and adapted to extend through a hole in a record card to make electrical contact with a circuit path on said printed circuit board, said element including a pair of integral leg portions extending radially from said bow-shaped portion through said panel aperture, the extremity of one leg portion of said pair being bent into clenching engagement with an opposite surface of said switch panel, and an electrical conductor electrically connected to the extremity of the other leg portion of said pair.

5. A mechanism for reading perforated record cards comprising in combination, a pair of frame members pivotally mounted with respect to each other, and movable from an open position for placement of a perforated record card therein, to a closed position with the record card therebetween, a printed circuit board having electrical circuit paths thereon supported by one of said frame members, a switch panel having a plurality of apertures therein and supported by said other frame member in alignment with said printed circuit board, a plurality of strip portions, having a plurality of bowed head portions extending therefrom, a plurality of interconnecting portions intermediate said head portions and curved in the same direction as said head portions, a pair of leg portions depending from each head portion to extend through an aperture in said panel, and a plurality of electrically non-conductive elements supported between said interconnecting portions and said switch panel.

6. A mechanism for reading perforated record cards comprising, in combination, a printed circuit board having electrical circuit paths, a switch panel having a plurality of apertures therein and supported in opposed facing relationship relative to said printed circuit board to permit placement of a record card therebetween, a switch element for securement in an aperture of said switch panel, said element having a bow shaped head portion abutting one surface of said panel and adapted to extend through a hole in said record card to make electrical contact with a circuit path on said board, and including an integral leg portion extending from said bow shaped portion into said aperture.

References Cited in the file of this patent

UNITED STATES PATENTS

| | | |
|---|---|---|
| 2,194,824 | Douglas | Mar. 26, 1940 |
| 2,856,492 | Heyhal | Oct. 15, 1958 |
| 2,864,909 | Cobb | Dec. 16, 1958 |
| 2,869,790 | Radke | Jan. 20, 1959 |
| 2,890,828 | Stark | June 16, 1959 |
| 2,949,522 | Glueckstein | Aug. 16, 1960 |